(12) United States Patent
Trigoni et al.

(10) Patent No.: US 10,281,282 B2
(45) Date of Patent: May 7, 2019

(54) DETERMINING THE POSITION OF A MOBILE DEVICE IN A GEOGRAPHICAL AREA

(71) Applicant: Oxford University Innovation Limited, Oxford (GB)

(72) Inventors: Niki Trigoni, Oxford (GB); Zhuoling Xiao, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 15/119,556

(22) PCT Filed: Feb. 16, 2015

(86) PCT No.: PCT/GB2015/050425
§ 371 (c)(1),
(2) Date: Aug. 17, 2016

(87) PCT Pub. No.: WO2015/121677
PCT Pub. Date: Aug. 20, 2015

(65) Prior Publication Data
US 2017/0074665 A1    Mar. 16, 2017

(30) Foreign Application Priority Data

Feb. 17, 2014  (GR) ................................ 2014010087
Mar. 27, 2014  (GB) .................................. 1405469.6

(51) Int. Cl.
*G06K 9/00*    (2006.01)
*G06K 9/46*    (2006.01)
(Continued)

(52) U.S. Cl.
CPC ........... *G01C 21/206* (2013.01); *G01C 21/32* (2013.01); *G01C 21/3667* (2013.01);
(Continued)

(58) Field of Classification Search
CPC .. G01C 21/206; G01C 21/32; G01C 21/3667; G06K 9/00476; G06K 9/4604; G06K 9/469; G06K 9/52; G06K 9/6224
See application file for complete search history.

(56) References Cited

U.S. PATENT DOCUMENTS

2012/0290254 A1* 11/2012 Thrun .................... G01C 21/16
                                                      702/150
2012/0295632 A1   11/2012 Karlsson et al.
(Continued)

FOREIGN PATENT DOCUMENTS

CA    2712673 A1    8/2009
CN    200580013871  4/2007
(Continued)

OTHER PUBLICATIONS

International Search Report and Written Opinion for PCT/GB2015/050425 dated Apr. 24, 2015, 13 pages.
(Continued)

*Primary Examiner* — Aaron L Troost
(74) *Attorney, Agent, or Firm* — Lathrop Gage LLP (57) ABSTRACT

A method of determining the position of a mobile device uses a model. The model is constructed by obtaining a map of a geographical area, constructing the graph using the map, wherein vertices of the graph correspond to areas of the map, and two vertices are joined by an edge when the areas corresponding to the vertices are adjacent and can be travelled between by a device, and building the one or more feature functions using the graph, wherein a feature value of the one or more feature functions indicates the extent to which the observations support the device being positioned in the areas corresponding to one or more vertices of the graph.

19 Claims, 4 Drawing Sheets

(51) Int. Cl.
*G06K 9/52* (2006.01)
*G06K 9/62* (2006.01)
*G01C 21/20* (2006.01)
*G01C 21/32* (2006.01)
*G01C 21/36* (2006.01)

(52) U.S. Cl.
CPC ....... *G06K 9/00476* (2013.01); *G06K 9/4604* (2013.01); *G06K 9/469* (2013.01); *G06K 9/52* (2013.01); *G06K 9/6224* (2013.01)

(56) References Cited

U.S. PATENT DOCUMENTS

| | | | | |
|---|---|---|---|---|
| 2013/0096885 | A1* | 4/2013 | Gupta | G01C 21/206 703/1 |
| 2013/0151140 | A1 | 6/2013 | Suh | |
| 2014/0336970 | A1* | 11/2014 | Troni-Peralta | G01C 25/00 702/96 |
| 2015/0300825 | A1* | 10/2015 | Manoliu | G01C 21/32 701/36 |

FOREIGN PATENT DOCUMENTS

| | | |
|---|---|---|
| EP | 1070229 B1 | 5/2006 |
| WO | WO 1995/004325 A1 | 2/1995 |
| WO | WO 2001/061271 A2 | 8/2001 |
| WO | WO 2003/088189 A1 | 10/2003 |
| WO | WO 2009/061058 A1 | 5/2009 |

OTHER PUBLICATIONS

Haibo, Hu et al. "Semantic location modeling for location navigation in mobile environment", Mobile Data Management, 2004. Proceedings. 2004 IEEE International Conference on Berkeley, CA, USA Jan. 19-22, 2004, Los Alamitos, CA, USA, IEEE Comput. Soc, US,Jan. 19, 2004 (Jan. 19, 2004), pp. 52-61.

Jensen, C.S. et al. "Graph Model Based Indoor Tracking," Mobile Data Management: Systems, Services and Middleware. 2009. MDM '09. Tenth International Conference on, IEEE, Piscataway, NJ, USA, May 18, 2009 (May 18, 2009), pp. 122-131, XP031476813, ISBN: 978-1-4244-4153-2.

Mohammadi, Ehsan. "Indoor Location Based Services," Sep. 30, 2011 (Sep. 30, 2011), XP055182635, Retrieved from the Internet: URL:http://www.ucalgary.cajengo_webdocsIAJH/12.20351_EhsanMohammadl.pdf [retrieved-on Apr. 13, 2015].

* cited by examiner

Fig. 3

DETERMINING THE POSITION OF A MOBILE DEVICE IN A GEOGRAPHICAL AREA

FIELD OF THE INVENTION

The present invention concerns methods and devices for determining the position of a mobile device in a geographical area. The invention is particularly applicable where the geographical area is an indoor area. More particularly, but not exclusively, the invention concerns methods of constructing models comprising graphs and feature functions for performing the determination.

BACKGROUND OF THE INVENTION

The identification of the position of a device when outdoors, for example to identify the position of a mobile phone, is primarily done using GPS (Global Positioning System). However, GPS data is not always available, particularly when a device is indoors, due to its reliance on radio signals emitted by dedicated GPS satellites. As a result, various positioning systems have been proposed that use do not use GPS data, but rather use motion measurements provided by inertial measuring units of devices, such as accelerometer, magnetometer and gyroscopic units. However, all systems so far proposed have drawbacks, and none has become predominant.

Electronic maps showing the boundaries in an area are becoming increasingly available, particularly for indoor areas. Such an electronic map can be considered to be a spatial graph with constraints. The most basic electronic map corresponds to a floor plan, which identifies the constraints on the possible motion within the floor plan, in other words the walls through which a person is not able to walk. Maps may also include other useful data (essentially metadata), such as the location of WiFi access points, radio fingerprints, signal strength peaks or distorted geomagnetic fields.

Various map matching techniques have been suggested for use with indoor positioning systems. In map matching, a series of observations are obtained over time, such as inertial trajectories or RF scans. Map matching then involves attempting to reconcile the observations with the constraints provided by the map, in order to estimate the most feasible trajectory (i.e. sequence of positions of the device), in other words the trajectory that violates the fewest constraints.

Suggested map matching techniques include those based on recursive Bayesian filters, such as particle/Kalman filters and Hidden Markov Models (HMMs). However, these techniques are computationally expensive, and so are typically run remotely on a server contacted via the Internet, rather than on a device itself. This leads to time delays ("lag"), lack of service in the absence of an reliable Internet connection, and the potential leaking of sensitive sensor/location information to third parties. These techniques also typically require high-precision sensor data in order to provide accurate results, leading to power drain on the device.

The present invention seeks to solve and/or mitigate the above-mentioned problems. Alternatively and/or additionally, the present invention seeks to provide improved positioning systems that are easily extendable to incorporate new types of sensor data in order to provide more accurate results.

SUMMARY OF THE INVENTION

In accordance with a first embodiment of the invention there is provided a computer-implemented method of constructing a model for determining the position of a mobile device in a geographical area, wherein the model comprises:

a graph comprising a set of vertices and a set of edges between the vertices;

one or more feature functions that take as input one or more vertices of the graph and a set of observations for the device, and return a feature value;

the method comprising the steps of:

obtaining a map of the geographical area;

constructing the graph using the map, wherein the vertices of the graph correspond to areas of the map, and two vertices are joined by an edge when the areas corresponding to the vertices are adjacent and can be travelled between by a device;

building the one or more feature functions using the graph, wherein the feature value of the one or more feature functions indicates the extent to which the observations support the device being positioned in the areas corresponding to the one or more vertices of the graph.

By using such a graph and feature functions defined using the graph, the position of the mobile device can be determined without GPS data being used, for example when reliable GPS data is not available due to obstructions between the device and GPS satellites, jamming of GPS radio signals, or when GPS signals may be spoofed.

A model can advantageously be provided that can be computed with efficiently and without requiring a large amount of memory. Further, the feature functions can be defined as desired to take into account different observations that can be made, giving flexibility and extendibility.

The mobile device may be a mobile phone, tablet, wearable device or the like. Alternatively, the mobile device may be a mobile autonomous/semi-autonomous machine such as a mobile industrial robot.

The observations for the mobile device may be provided by sensors such as accelerometers, magnetometers, gyroscopes, WiFi (i.e. radio) sensors or the like. The sensors may be incorporated into the device, or may be provided by other devices, such as a sensor worn on the body of a user of the device or another device carried by a user.

The map may be 2-dimensional or 3-dimensional. The map may for example cover several floors of a building. In the case the map is of a building, for example, features such as stairs and elevators can be identified, providing more constraints for the proposed model and increasing the accuracy of positioning.

Advantageously, observations are provided only by the accelerometer and magnetometer of the device, as these require less energy than other sensors (for example gyroscopes may use 10 times more energy, and WiFi 200 times more energy.) Further, wearable device may only incorporate accelerometers and magnetometers in order to preserve energy. It has been found that the method of the invention is robust enough to provide accurate results even when using only with the "noisy" sensor data provided by accelerometers and magnetometers.

Advantageously, the geographical area is an indoor area. The indoor area may be the interior of a building, but alternatively may be a cave, underground tunnel, industrial pipeline or the like.

Preferably, the model comprises a feature function that takes as input first and second vertices of the graph, and a set of observations indicating the movement of the device from the area corresponding to the first vertex to the area corresponding to the second vertex. Preferably the movement observation includes a distance and angle for the movement.

Advantageously, the model comprises a feature function that takes as input first and second vertices of the graph, and a set of observations indicating the movement of the device from the area corresponding to the first vertex to the area corresponding to the second vertex corrected by a determined rotation angle. Preferably, the rotation angle is determined over a pre-determined length time window.

The model may comprise a feature function that takes as input a vertex of the graph and a set of observations indicating radio signal strength measurements taken by the device in the area corresponding to the vertex.

It will be appreciated that feature functions based on any other observations provided by sensors of the device could be used.

Preferably, the step of constructing the graph includes the step of removing any vertex which corresponds to an area which could not be reached by a device. This makes computation using the model much more efficient. Vertexes to be removed can be identified by checking if a chain of edges to a reachable vertex exists.

Each feature function has a corresponding weight value. In that case, the method may include the step of determining the weight values for the feature functions by training the model using at least one known device trajectories and corresponding set of observations.

In accordance with a second embodiment of the invention there is provided a computer-implemented method of determining the position of a mobile device using a model obtained using the method of any preceding claim, comprising the steps of:

obtaining a set of observations from the sensors of the device;

determining the trajectory for the device that optimises the values given by the feature functions given for the set of observations; and determining the position of the device to be the end point of the trajectory.

The mobile device may be a mobile phone, tablet, wearable device or the like. Advantageously, observations are provided only by the accelerometer and magnetometer of the device. As discussed above, these require less energy than other sensors, and wearable device may only incorporate accelerometers and magnetometers.

Advantageously, the method is performed on a co-processor of the mobile device, and does not require the main processor of the mobile device to be used.

The optimisation may be done using the Viterbi algorithm.

Preferably, the method further comprises the step of displaying the determined position on a map on the screen of the device.

Advantageously, the method further comprises the step of determining a heading for the device, and using the determined heading to correct a heading bias in the set of observations.

Advantageously, the method further comprises the step of determining at least one parameter used for determining the observations for the device. The parameter can then be used improve the accuracy of observations obtained for the device, so helping to ensure the robustness of the method when determining position over long time-periods, and preventing "drift". Advantageously the at least one parameter includes a step parameter. The step parameter may be step length, step frequency coefficient and/or step constant. Further advantageously, the at least one parameter includes a heading bias parameter.

In accordance with a third embodiment of the invention there is provided a computing device arranged to perform any of the methods described above. The computing device may for example be a server that can communicate via the Internet. Preferably, the computing device is further arranged to send the constructed model to a mobile device.

The computing device may be a mobile device. The mobile device may be a mobile phone, tablet, wearable device or the like. Preferably, the mobile device is further arranged to receive the constructed model from a computer device. Alternatively, the mobile device may be arranged to construct the model itself.

In accordance with a fourth embodiment of the invention there is provided a system comprising a computing device as described above and a mobile device as described above. The computing device and mobile device may communicate over the Internet.

In accordance with a fifth embodiment of the invention there is provided a computer program product arranged, when executed on a computing device, to perform any of the methods described above. The computing device may be a mobile device.

In accordance with a sixth embodiment of the invention there is provided a computer program product arranged, when executed on a computing device, to provide a computing device as described above. The computing device may be a mobile device.

In accordance with a ninth embodiment of the invention there is provided a computer program product arranged, when executed on a mobile device, to provide the mobile device described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

A system in accordance with an embodiment of the invention is now described with reference to FIGS. 1 to 3. The system determines the position of a device by map matching using an undirected graph model, in particular a model based upon linear chain conditional random fields (CRFs), as described in detail below. CRFs have been successfully used for various applications such as computer vision (e.g. to classify regions of an image), bioinformatics (e.g. to segment genes in a strand of DNA), and natural language processing (e.g. to extract syntax from natural-language text).

CRFs are undirected probabilistic graphical models that were introduced in J. D. Lafferty, A. McCallum, F. C. N. Pereira, Conditional random fields: Probabilistic models for segmenting and labelling sequence data, Proceedings of the Eighteenth International Conference on Machine Learning, ICML '01, pp. 282-289, 2001. In linear chain CRFs, the conditional probability of states given observations is proportional to the product of potential functions that link observations to consecutive states, as expressed by the following equation:

$$p_\lambda^*(S \mid Z) \propto \prod_{j=1}^{T} \Psi(S_{j-1}, S_j, Z, j)$$

where j denoted the position in the observation sequence, and $\Psi$ are potential functions. A potential function is composed of multiple feature functions $f_i$, each of which reflects in a different way how well the two states $S_{j-1}$ and $S_j$ are supported by the observations Z. Feature functions can refer to different subset of observations (from a single step or from multiple steps), and may depend on one or both of $S_{j-1}$ and $S_j$:

$$\Psi_j(S_{j-1}, S_j, Z, j) = \exp\left(\sum_{i=1}^{m} \lambda_i * f_i(S_{j-1}, S_j, Z, j)\right)$$

Figure 1:
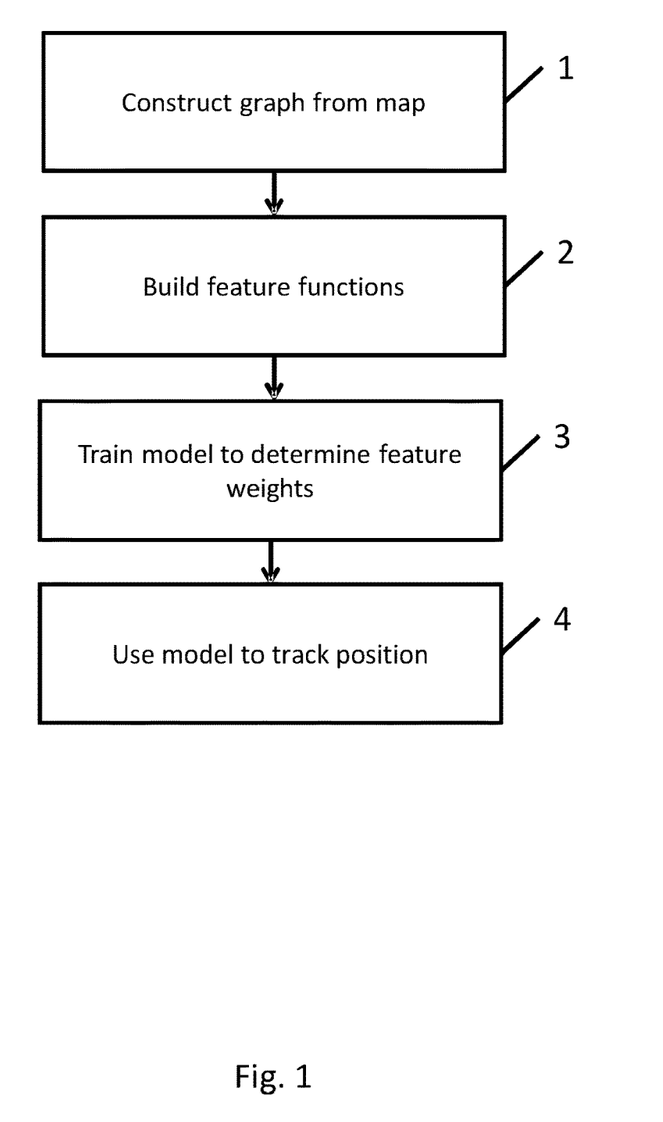
FIG. 1 is a flowchart showing the operation of a system in accordance with an embodiment of the invention at the highest level.

FIG. 1 is a flow chart showing the operation of the system at the highest level. The steps of operation are as follows; each step is described in more detail later below.

First, a map for the indoor area within which the position of the device is to be determined is obtained, and is used to construct a graph (step 1). Once the graph has been constructed, it is used to build a set of "feature functions" (step 2), which are used with the observations that are obtained from the device. The "model" comprises the graph and corresponding feature functions.

The model is then trained, in order to determine "weights" for the features of the graph (step 3). This step optimises the accuracy of the model, by applying the model to one or more sets of observation with known trajectories, and then "tuning" the weights so that the model best fits the known trajectories when applied to those sets of observations. However, it has been found that the system of the invention can provide reliable results when the step of training the model is omitted, and so in alternative embodiments of the invention no training of the model is performed.

Once the model has been obtained and trained (if desired), it can be used with real-time observations from a device to identify the position of the device (step 4). During use of the model to determine the position of the device, parameters that are used when making observations can also be determined and optimised. For example, step length parameters used by motion sensing algorithms to make motion observations, and heading estimation parameters used to make heading observations, can be determined.

Figure 2A:
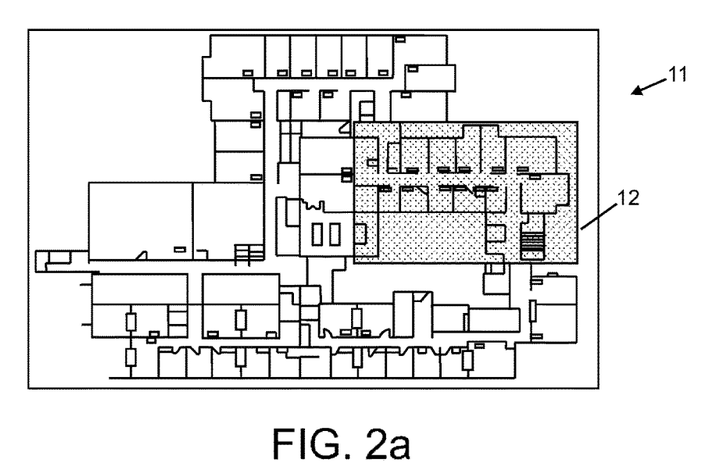
FIGS. 2a to 2b show creating of the graph in accordance with the embodiment of FIG. 1.

The construction of the graph from the map is now described with reference to FIGS. 2a to 2d. First, the map is obtained, for example the map 11 representing the floor plan of a floor of a building as shown in FIG. 2a. The map is then processed to generate the graph; the later figures show the process as applied to the area 12 of the map, though in practice the entire map will typically be processed, of course. Conventional edge-detection algorithms may be used to "clean" the map 11, e.g. to determine the edges are relevant to movement within the mapped area (i.e. the walls) in a colour map.

Figure 2B:
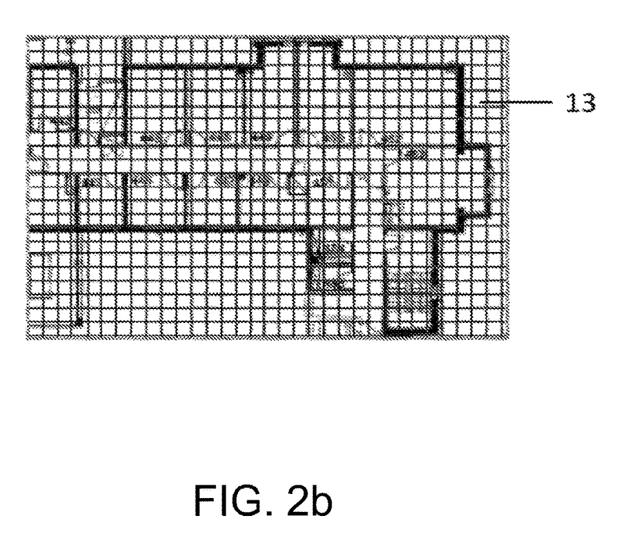

The map 11 is divided into equal sized cells 13, as shown in FIG. 2b. A smaller cell size results in a model with increased accuracy, but at the expense of computational cost. A suitable cell size has been found to be a square cell with edge length the same as the average step length that will be matched, for example 0.8 meters.

Figure 2C:
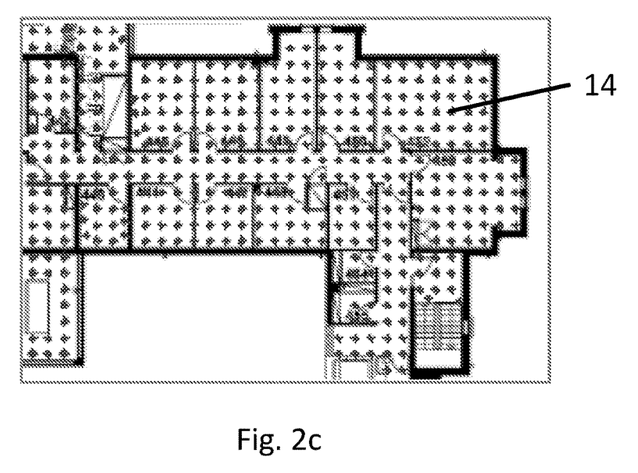

A graph is then constructed from the cells 13, to give the vertices 14 as shown in FIG. 2c. Each vertex 14 corresponds to a cell 13. (In alternative embodiments of the invention, a vertex can correspond to a contiguous set of cells.)

Vertices are joined by an edge if they share a common geographical border (i.e. if they share edges or corners) and if their centre-points are "connected", i.e. there is no wall on the map preventing movement between the two cells. Any unreachable vertices are removed from the graph, i.e. vertices that correspond to cells in which it is impossible for a device to be positioned. This is important to give efficient computational performance using the model.

Figure 2D:
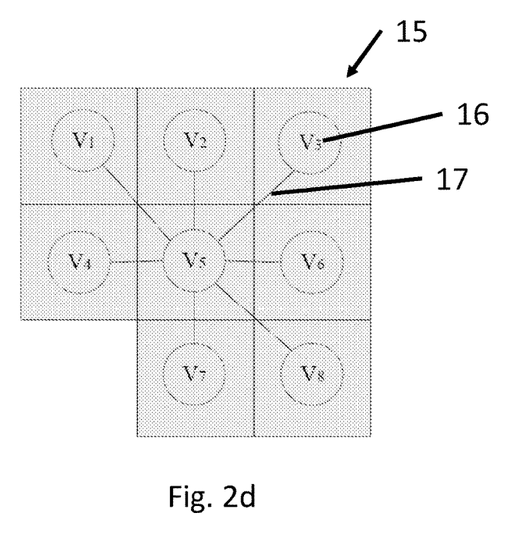

A resulting graph 15, with vertices 16 and edges 17, is shown in FIG. 2d. (Note the graph of FIG. 2d of course does not correspond to the graph for the map area shown in FIG. 2c, of course.)

The building of the feature functions for the model is now described. A feature function $f_i$ defines the degree to which a set of observations Z supports the belief that there has been a change of state from $S_{t-1}$ to $S_t$; the stronger support, the higher the value of $f_i(S_{t-1}, S_t, Z)$. In the model, a state will correspond to a position for the device, and so a larger value for $f_i$ means a higher likelihood that the device moved from the position given by the state $S_{t-1}$ to the position given by the state $S_t$. With CRFs any set of observations can be used, but it will be appreciated that those most close in time to t will be of most relevance.

A first feature function $f_1$ of the model indicates the extent to which an inertial measurement $Z^{in}_t$ supports a transition between state $S_{t-1}$ and $S_t$:

$$f_1(S_{t-1}, S_t, Z^{in}_t) = I(S_{t-1}, S_t) \times (f_1^\theta(S_{t-1}, S_t, Z^\theta_t) + f_1^l(S_{t-1}, S_t, Z^l_t))$$

where $I(S_{t-1}, S_t)$ is an indicator function equal to 1 when states $S_{t-1}$ and $S_t$ are connected and 0 otherwise. The inertial observation $Z^{in}_t$ has two components, the measured length $Z^l_t$ and the angle (heading) $Z^\theta_t$ of displacement, which are assumed to be independent. $f^\theta_1$ and $f^l_1$ are the functions to relate the angle and length to the underlying graph, respectively. The function $f^\theta_1$ is defined as:

$$f_1^\theta(S_{t-1}, S_t, Z^\theta_t) = \ln\frac{1}{\sigma_\theta\sqrt{2\pi}} - \frac{(Z^\theta_t - \theta(S_{t-1}, S_t))^2}{2\sigma_\theta^2}$$

where $\theta(S_{t-1}, S_t)$ is the orientation of the edge between states $S_{t-1}$ and $S_t$, and $\sigma_\theta^2$ is the variance of the observation $Z^\theta_t$. The function $f^l_1$ is defined similarly.

A second feature function $f_2$ of the model handles correlations in heading errors in a recent time window. It does this by measuring how well a corrected inertial measurement $Z^{in}_t(\hat{\theta})$, which is derived by rotating $Z^{in}_t$ by angle $\theta$, supports a transition between state $S_{t-1}$ and $S_t$:

$$f_2(S_{t-1}, S_t, Z_{0:t}) = f_1(S_{t-1}, S_t, Z^{in}_t(\hat{\theta}))$$

where $\hat{\theta}$ is estimated as the estimated as the average heading difference between the estimated and measured headings from t-w to t, where w is a suitable window size parameter, for example 5. The estimated headings are based on maximum likelihood estimates (MLEs) generated during use of the model to determine the position, as described below. More specifically:

$$\hat{\theta} = \sum_{i=1}^{w} \Theta(S_{t-i}^{MLE} - S_{t-i-1}^{MLE}, Z_{t-i}^{\theta})/w$$

where $\Theta$ represents the angle between two vectors, and $S^{MLE}_t$ is the MLE of the state at time t taking into account all observations from 0 to t. MLE state estimates are computed efficiently using the Viterbi algorithm, again as described below.

A third feature function $f_3$ of the model takes into account signal strength observations in conjunction with a radio fingerprint map, if it is available for the map area. (A radio fingerprint map is a map of radio signal strength (RSS) data for known nearby radio sources, such as WiFi access points.) Unlike the previous feature functions which constrain state transitions, this feature function constraints individual states. It is defined as follows:

$$f_3(S_t, S_t, Z_t^{RSS}) = -(S_t - \mu_t)^T (\Sigma_t)^{-1} (S_t - \mu_t)$$

where the observation $Z^{RSS}_t$ has two components, the estimated mean $\mu_t$ and the covariance $\Sigma_t$ of the current position given (RSS) fingerprint data. This feature function measures the negative squared Mahalanobis distance between the state and the RSS-based position estimate.

The feature functions of the model are combined to give the potential function:

$$\Psi_j(S_{j-1}, S_j, Z, j)$$

as described above. It is an advantageous feature of the present invention that any set of available feature functions can be used. Preferred embodiments of the invention will use the first and second feature functions described above, or feature functions that relate to similar observations. Embodiments of the invention may not use the third feature function described above in order to reduce the complexity of the model, or simply because a radio fingerprint map is not available. Alternative embodiments of the invention may use any other suitable feature functions, for example if a radio map PeakPointInMap(St) were available containing the locations where the received signal strength indicator (RSSI) from an access point takes a local peak value, the feature function:

$$f_4(S_t, Z_{t-w:t+w}) = \begin{cases} 1 & \text{if } Z_t = \max(Z_{t-w:t+w}) \\ & \text{and } PeakPointInMap(S_t) \\ 0 & \text{otherwise} \end{cases}$$

could additionally be used.

The training of the model is now described. The training uses a set of training data T, which consists of one or more true trajectories, and corresponding sequences of sensor observations. The goal of the training is to tune the feature weights $\lambda_i$ in the potential functions $\Psi$ so that the observations best support the corresponding true trajectories. The weights reflect how well the corresponding feature functions can be relied upon as support for a particular state transition.

Training the model is performed by maximising the log-likelihood on the training data T, i.e. the log of the conditional probability of states given observations:

$$L_{\lambda}(T) = \sum_{((S,Z)\in T)} \log p_{\lambda}^*(S \mid Z)$$

By taking the partial derivative of the log likelihood function with respect to each feature $\lambda_i$ and setting it to 0, the maximum entropy model constraint:

$$E_T(f_i) - E(f_i) = 0$$

is obtained; that is, the expected value of the i-th feature under the empirical distribution $E_T(f_i)$ is equal to its expected value under the model distribution $E(f_i)$, where the two expected values are:

$$E_T(f_i) = \sum_{((S,Z)\in T)} \sum_{j=1}^{T} f_i(S_{j-1}, S_j, Z, j)$$

Setting the gradient to zero does not always allow an analytical solution for the weights $\lambda_i$ to be obtained, in which case iterative methods such as iterative scaling or gradient-based methods must be used. Regardless of the method used, it is of course desirable to compute $E_T(f_i)$ and $E(f_i)$ efficiently. This can be done for $E_T(f_i)$ simply by going over each training sequence, summing up the weighted sum of feature functions over all time steps, and summing up the result for all training sequences. Computing $E(f_i)$, however, is slightly more complicated and requires the use of a dynamic programming approach, known as the Forward-Backward algorithm, similar to the one typically used for Hidden Markov Models. The application of this algorithm to CRFs is described in R. Klinger, K. Tomanek, Classical probabilistic models and conditional random fields, TR07-2-013, Technische Universitat Dortmund, 2007.

The use of the model to determine the position of a device using obtained observations is now described. As discussed above, this may be done after the model has been trained, or alternatively the training step may be omitted.

Determining the position the device using the model means finding the most likely sequence of hidden states, i.e. the most likely trajectory S*. This is done by solving the optimisation problem:

$$S^* = \underset{S}{\operatorname{argmax}} p(S \mid Z)$$

This can be done using the Viterbi algorithm as described in G. D. Forney, The Viterbi algorithm, Proceedings of the IEEE 61(3): 268-278, March 1973. At each step, the highest score $\delta_j(s)$ along a path at position j that ends in each possible value s for state $S_{31}$ is calculated:

$$\delta_j(s \mid Z) = \max_{s' \in S} \delta_{j-1}(s') \Psi_j(s', s, Z, j)$$

and a lattice is gradually filled with these values. The most-recently-filled column of the lattice represents a discrete distribution $p(S_t|Z_{1:t})$, and this is normalised and converted to a 2-dimensional Gaussian distribution, with mean $\hat{\mu}$ and variance $\Sigma$ determined by the MLE estimates:

$$\hat{\mu} = \sum_{i=1}^{N} S_i p(S_i | Z_{1:i}), \hat{\Sigma} = \sum_{i=1}^{N} (S_i - \hat{\mu}) p(S_i | Z_{1:i})$$

The accuracy of the current position estimate is calculated using the $2\sigma$ or $3\sigma$ rule.

In particular embodiments, the use of the model involves one or both of the following additional optimisations. For the first optimisation step, when the estimated location accuracy is high the current step's discrete distribution is replaced with its Gaussian approximation; this helps remove low probabilities far away from the true location, and move them closer to the true location thus slightly extending the estimated error ellipse. This makes the model more robust to slight over- or under-estimation of step length which, after several steps, can make the estimated position drift away from the true position. The second optimisation uses the model to estimate the heading at each step, as well as the position. More specifically, when there is a high confidence in a determined path, estimates of headings are generated and compared with the raw heading data provided by the inertial sensors of the device. This allows any bias of the gyroscope of the device to be determined and corrected.

As discussed above, during use of the model, parameters used for the observations can be determined.

A step length parameter, in particular a step constant Y, can be determined as now described. The step constant is used for motion detection by determining an estimate step length $l_t$ using the equation:

$$l_t = h(\alpha f_t + \beta) + \gamma$$

where $f_t$ is step frequency, h is the pedestrian height, $\alpha$ is the step frequency coefficient, and $\beta$ is the step constant given pedestrian height.

The key idea of the step length parameter learning is that only when the estimated step length is the same as (or very close to) the real step length can the maximum conditional probability of the state sequence given the observation be obtained. This means that step constant learning can be taken to be the optimization problem:

$$\gamma^* = \underset{\gamma}{\operatorname{argmax}} \ln p(S | Z).$$

The feature functions described above cannot be used for step length parameter learning. Instead, starting with an initial Y the whole training trajectory is divided into segments of length the same as the graph edge length. A new feature function only taking into account the heading observation is then defined as:

$$f_t(S_{t-1}, S_t, Z_t^\theta) = \ln \frac{1}{\sigma_\theta \sqrt{2\pi}} - \frac{(Z_t^\theta - \theta(S_{t-1}, S_t))^2}{2\sigma_\theta^2}$$

where $Z_t^\theta$ is the heading observation at time t, $\theta(S_{t-1}, S_t)$ is the orientation of the edge from state $S_{t-1}$ to state $S_t$, and $\sigma_\theta^2$ is the heading observation variance. The optimization problem is then solved by the hard EM process of iterating over the steps:

$$E\text{-step: } S^i = \underset{S}{\operatorname{argmax}} p(S | Z, \lambda^{i-1}),$$

$$M\text{-step: } \lambda^i = \underset{\lambda}{\operatorname{argmax}} \ln p(S | Z),$$

The step frequency coefficient $\alpha$ and step constant $\beta$ can be also be determined during use of the model using a similar approach to that used for the step constant Y.

An initial heading bias $\Delta h$ is obtained by solving the optimisation problem:

$$\Delta h^* = \underset{\Delta h}{\operatorname{argmax}} \sum_{t=1}^{t'} (\theta_t^{gyro} - \theta_t^{mag} - \Delta h)^2$$

where h is the heading bias at time t=0, t' is the time the pedestrian has walked before the bias estimation (empirically found to be of the order of 30 to 90 seconds), $\theta^{gyro}$ and $\theta^{mag}$ are the headings estimated from the gyroscopic sensors and magnetometers of the device at time t, respectively. The estimated initial heading bias is then fed into a conventional unscented Kalman filter mentioned to provide accurate heading estimations.

Thus, the initial heading bias is obtained by combining gyroscope and magnetometer data. Gyroscopic sensors have high accuracy within a short time period, but suffer significantly from long-term bias because of thermo-mechanical events. In contrast, magnetometers do not have long-term drift, but lack of short-term accuracy due to the soft or hard iron effect. Therefore, the two types of sensors can compensate each other to offer highly accurate heading estimations. However, the initial heading can only be estimated from magnetometer and thus a big bias might be introduced; this is compounded by there being at the beginning of the process no other information from the map constraints to correct the initial heading estimation. Due to the crucial nature of the initial heading (it impacts on all subsequent heading estimations), it is necessary to learn the initial heading bias as soon as possible. This is then used to correct heading observations provided by the device, and so improve the performance of the model.

Figure 3:
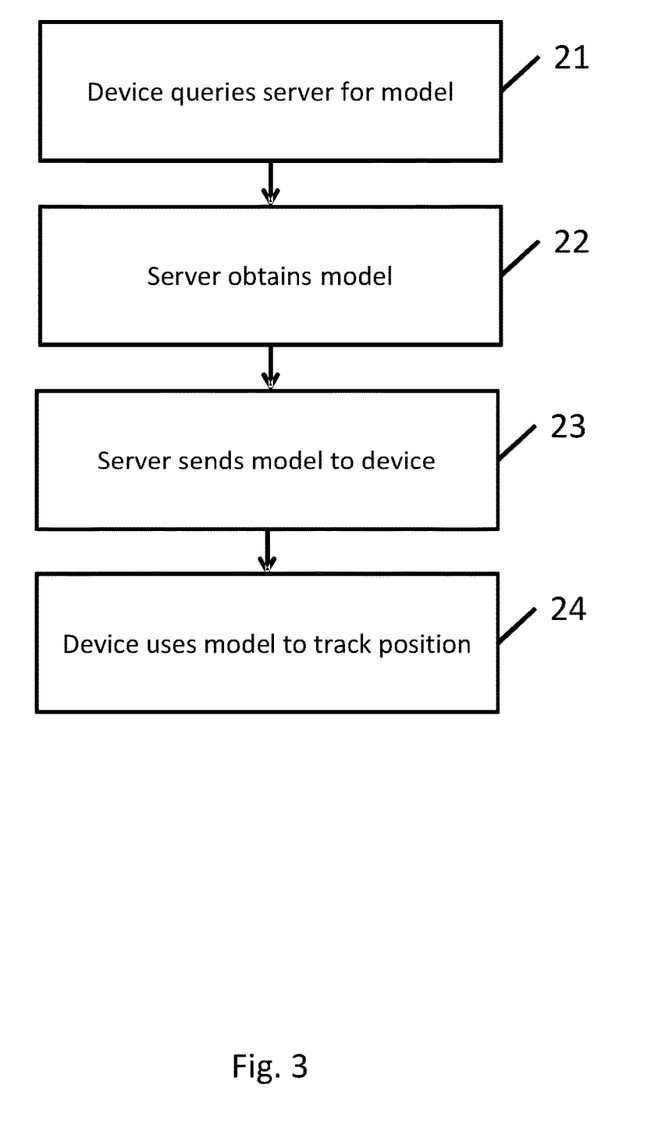
FIG. 3 is a flowchart showing an embodiment of the invention in which the position determining system is used to determine the position of a device in communication with a remote server.

FIG. 3 is a flowchart showing an embodiment of the invention in which the position determining system is used to determine the position of a device in communication with a remote server. The device wishes to determine its location in an indoor area. First, the device queries the server for a model for the indoor area (step 21). The server then obtains a model for the indoor area (step 22). It may do this by performing the steps of obtaining a map, constructing a graph and so on, as described above. Alternatively, the server may have a model that it previously constructed for the indoor area, or be able to obtain a model for a repository of such models. The server then sends the model to the device (step 23).

In alternative embodiments, the device constructs the model itself, using a map obtained from a remote device such as a server.

The device then uses the model as described above to determine its location (step 24); in particular, the device is able to do the determination itself without requiring any further communication with the server.

To determine its location, the device uses the model to find the most likely trajectory, as described above. As part of this, the device also determines the step length and heading bias parameters as described above. At each step, the device obtains a Gaussian distribution indicating its position. The device then displays this distribution overlaid on the map on the screen of the device, to indicate to the user of the device their determined position.

While the present invention has been described and illustrated with reference to particular embodiments, it will be appreciated by those of ordinary skill in the art that the invention lends itself to many different variations not specifically illustrated herein.

The invention claimed is:

1. A computer-implemented method for determining the position of a mobile device, the method comprising:
   constructing a model for determining position of a mobile device in a geographical area, wherein the model comprises:
      a graph comprising a set of vertices and a set of edges between the vertices;
      one or more feature functions that take as input one or more vertices of the graph and a set of observations for the device, and return a feature value;
   the method comprising constructing the model via executing the steps of:
      obtaining a map of the geographical area;
      constructing the graph using the map, wherein the vertices of the graph correspond to areas of the map, and two vertices are joined by an edge when the areas corresponding to the vertices are adjacent and can be travelled between by a device;
      building the one or more feature functions using the graph, wherein the feature value of the one or more feature functions indicates the extent to which the observations support the device being positioned in the areas corresponding to the one or more vertices of the graph;
      obtaining a set of observations from sensors of the device;
      determining trajectory for the device that optimizes the values given by the feature functions given for the set of observations; and
      determining the position of the device to be an end point of the trajectory.

2. The computer-implemented method as claimed in claim 1, wherein the model comprises a feature function that takes as input a first and a second vertex of the graph, and a set of observations indicating the movement of the device from the area corresponding to the first vertex to the area corresponding to the second vertex.

3. The computer-implemented method as claimed in claim 1, wherein the model comprises a feature function that takes as input a first and a second vertex of the graph, and a set of observations indicating the movement of the device from the area corresponding to the first vertex to the area corresponding to the second vertex corrected by a determined rotation angle.

4. The computer-implemented method as claimed in claim 1, wherein the model comprises a feature function that takes as input a vertex of the graph and a set of observations indicating radio signal strength measurements taken by the device in the area corresponding to the vertex.

5. The computer-implemented method as claimed claim 1, wherein the step of constructing the graph includes the step of removing any vertex which corresponds to an area which could not be reached by a device.

6. The computer-implemented method as claimed in claim 1, wherein each feature function has a corresponding weight value.

7. The computer-implemented method as claimed in claim 6, further comprising the step of determining the weight values for the feature functions by training the model using at least one known device trajectories and corresponding set of observations.

8. The computer implemented method as claimed in claim 1, further comprising the step of determining a heading for the device, and using the determined heading to correct a heading bias in the set of observations.

9. The computer-implemented method as claimed in claim 1, further comprising the step of determining at least one parameter used for determining the observations for the device.

10. The computer-implemented method as claimed in claim 9, wherein the at least one parameter includes a step parameter.

11. The computer-implemented method as claimed in claim 9, wherein the at least one parameter includes a heading bias parameter.

12. A computing device arranged to perform the method of claim 1.

13. The computing device as claimed in claim 12, further arranged to send the constructed model to a mobile device.

14. The computing device as claimed in claim 12, wherein the computing device is a mobile device.

15. The computing device of claim 14, wherein the mobile device is further arranged to receive the constructed model from a computer device.

16. A system comprising a computing device as claimed in claim 12.

17. A non-transitory computer program product arranged, when executed on a computing device, to perform the method of claim 1.

18. The non-transitory computer program product as claimed in claim 17, wherein the computing device is a mobile device.

19. A non-transitory computer program product arranged, when executed on a computing device, to provide the computing device of claim 12.

* * * * *